(12) United States Patent
Sonnekalb

(10) Patent No.: US 12,079,507 B2
(45) Date of Patent: Sep. 3, 2024

(54) STORAGE DEVICE AND METHOD FOR MODIFYING MEMORY CELLS OF A STORAGE DEVICE

(71) Applicant: Infineon Technologies AG, Neubiberg (DE)

(72) Inventor: Steffen Sonnekalb, Munich (DE)

(73) Assignee: Infineon Technologies AG, Neubiberg (DE)

(*) Notice: Subject to any disclaimer, the term of this patent is extended or adjusted under 35 U.S.C. 154(b) by 102 days.

(21) Appl. No.: 17/666,762

(22) Filed: Feb. 8, 2022

(65) Prior Publication Data

US 2022/0261176 A1 Aug. 18, 2022

(30) Foreign Application Priority Data

Feb. 18, 2021 (DE) .......................... 102021201580.8

(51) Int. Cl.
*G06F 3/06* (2006.01)
(52) U.S. Cl.
CPC .......... *G06F 3/0655* (2013.01); *G06F 3/0604* (2013.01); *G06F 3/0673* (2013.01)
(58) Field of Classification Search
None
See application file for complete search history.

(56) References Cited

U.S. PATENT DOCUMENTS

| | | | | |
|---|---|---|---|---|
| 6,151,641 A * | 11/2000 | Herbert | ................... | G06F 13/28 714/6.24 |
| 6,748,488 B2 * | 6/2004 | Byrd | ................... | G06F 11/1076 714/E11.034 |
| 8,972,345 B1 * | 3/2015 | Aguilera | ............... | G06F 16/182 707/758 |
| 10,599,350 B2 * | 3/2020 | Kern | ....................... | G06F 3/0604 |
| 2002/0188665 A1 * | 12/2002 | Lash | ................... | H04L 63/0281 707/E17.12 |
| 2007/0156593 A1 * | 7/2007 | Porte | ....................... | G06Q 40/04 705/51 |
| 2010/0095052 A1 * | 4/2010 | Chen | ..................... | G06F 3/0688 711/E12.001 |

* cited by examiner

*Primary Examiner* — Elias Mamo
(74) *Attorney, Agent, or Firm* — Murphy, Bilak & Homiller, PLLC

(57) ABSTRACT

A storage device comprises a plurality of bitwise-modifiable memory cells. A control device is also provided, which, in order to modify existing data content written to a group of memory cells with new data content to be written, is designed to compare the existing data content and the data content to be written in order to obtain a comparison result. The control device is designed to determine a subset of the group of memory cells for modification and a remaining length based on the comparison result, and to write the data content to be written to the subset, leaving the remaining set at least partially unchanged. For modifying the existing data content, the storage device is designed to read from a memory location of the storage device and to verify the correctness of the memory location.

20 Claims, 7 Drawing Sheets

500

```
┌─────────────────────────────────────────────────────┐
│ Reading an existing data content written to the group│
│ of memory cells from a memory location of the        │ — 510
│ storage device                                       │
└─────────────────────────────────────────────────────┘
                          │
┌─────────────────────────────────────────────────────┐
│ Verifying the correctness of the memory location     │ — 520
│ for the modification                                 │
└─────────────────────────────────────────────────────┘
                          │
┌─────────────────────────────────────────────────────┐
│ Comparing an existing data content written to the    │
│ group of memory cells with a data content to be      │ — 530
│ written in order to obtain a comparison result       │
└─────────────────────────────────────────────────────┘
                          │
┌─────────────────────────────────────────────────────┐
│ Determining a subset of the group of memory cells    │
│ for modification and a remaining set of memory cells │
│ based on the comparison result so that, based on the │ — 540
│ modification of the subset, the data content to be   │
│ written is written to the group of memory cells,     │
│ leaving the remaining set at least partially         │
│ unchanged                                            │
└─────────────────────────────────────────────────────┘
```

Fig. 5

STORAGE DEVICE AND METHOD FOR MODIFYING MEMORY CELLS OF A STORAGE DEVICE

TECHNICAL FIELD

The present disclosure relates to a storage device, in particular an electronic data storage device. This disclosure also relates to a method for modifying a variety of bitwise-modifiable memory cells of a storage device and, in particular, RRAM (Resistive Random Access Memory) clone protection.

BACKGROUND

Electronic data storage devices can store information in memory cells, for example in the form of binary values such as 0 or 1. It may be necessary to modify the content of memory cells, that is, to manipulate or modify one or more memory cells with respect to the information stored in them.

There is a need to be able to modify memory contents securely, in order to maintain a high level of data security.

SUMMARY

According to an exemplary embodiment, a storage device has a plurality of bitwise-modifiable memory cells. A control device is provided, which is designed, in order to modify the existing data content written to a group of memory cells with new data content to be written, to compare the existing data content and the data content to be written in order to obtain a comparison result. The control device is designed to determine a subset of the group of memory cells for modification and a remaining set based on the comparison result, and to write the data content to be written to the subset, leaving the remaining set at least partially unchanged. For modifying the existing data content, the storage device is designed to read from a memory location of the storage device and to verify the correctness of the memory location.

According to an exemplary embodiment, a method for modifying a plurality of bitwise-modifiable memory cells of a storage device comprises reading an existing data content written to a group of memory cells from the storage device and verifying that the memory location is correct for the modification. The method comprises comparing an existing data content written to the group of memory cells with a data content to be written in order to obtain a comparison result. The method also comprises determining a subset of the group of memory cells for modification and a remaining set of memory cells based on the comparison result so that the data content to be written is written to the subset of the group of memory cells, leaving the remaining set at least partially unchanged.

According to an exemplary embodiment, a computer program that may be stored on a non-volatile data storage device has program code for carrying out such a method when the program is running on a computer.

Additional advantageous exemplary embodiments are defined in the dependent sub-claims.

BRIEF DESCRIPTION OF THE FIGURES

Exemplary embodiments will be explained below with reference to the accompanying drawings. In the drawings:

FIG. 5 shows a schematic flowchart of a method according to an exemplary embodiment.

DETAILED DESCRIPTION

Before exemplary embodiments of the present invention are explained in detail below on the basis of the drawings, it is pointed out that identical, functionally identical or equivalent elements, objects and/or structures are provided with the same reference signs in the different figures, so that the description of these elements presented in different exemplary embodiments can be exchanged for or applied to one another.

Exemplary embodiments described in the following are described in connection with a large number of details. However, exemplary embodiments can also be implemented without these detailed features. In addition, for reasons of intelligibility, exemplary embodiments are described using block diagrams as a substitute for a detailed representation. Furthermore, details and/or features of individual exemplary embodiments can be readily combined with on another unless it is explicitly stated to the contrary.

The following exemplary embodiments refer to the modification of memory contents of memory cells of storage devices, in particular electronic data storage devices. Some of the exemplary embodiments are described with reference to resistance-based RAM (RRAM) memory cells, although the exemplary embodiments are not limited to this. Alternatively or additionally, in accordance with exemplary embodiments a storage device may comprise ferroelectric RAM (FRAM) memory cells, magneto-resistive RAM (MRAM) memory cells, phase-changing RAM (PCRAM) memory cells, or other bitwise variable memory cells, in particular non-volatile memory cells.

Memory cells can be located or addressed under specific addresses in a storage device, wherein the exact mechanisms for addressing a memory cell are not examined in detail. According to one example, a data word in a memory can be addressed under an address and a specific memory cell within the word can be selected to be subjected to a modification operation. In the exemplary embodiments described here, a modification operation is understood to mean a change in the information content from a logical zero to a logical one or from a logical one to a logical zero. Nevertheless, the exemplary embodiments described herein are not limited to this, but are also readily applicable to memory cells or memory cell groups that can have more than two logical states, for example at least three, at least four or more.

Figure 1:
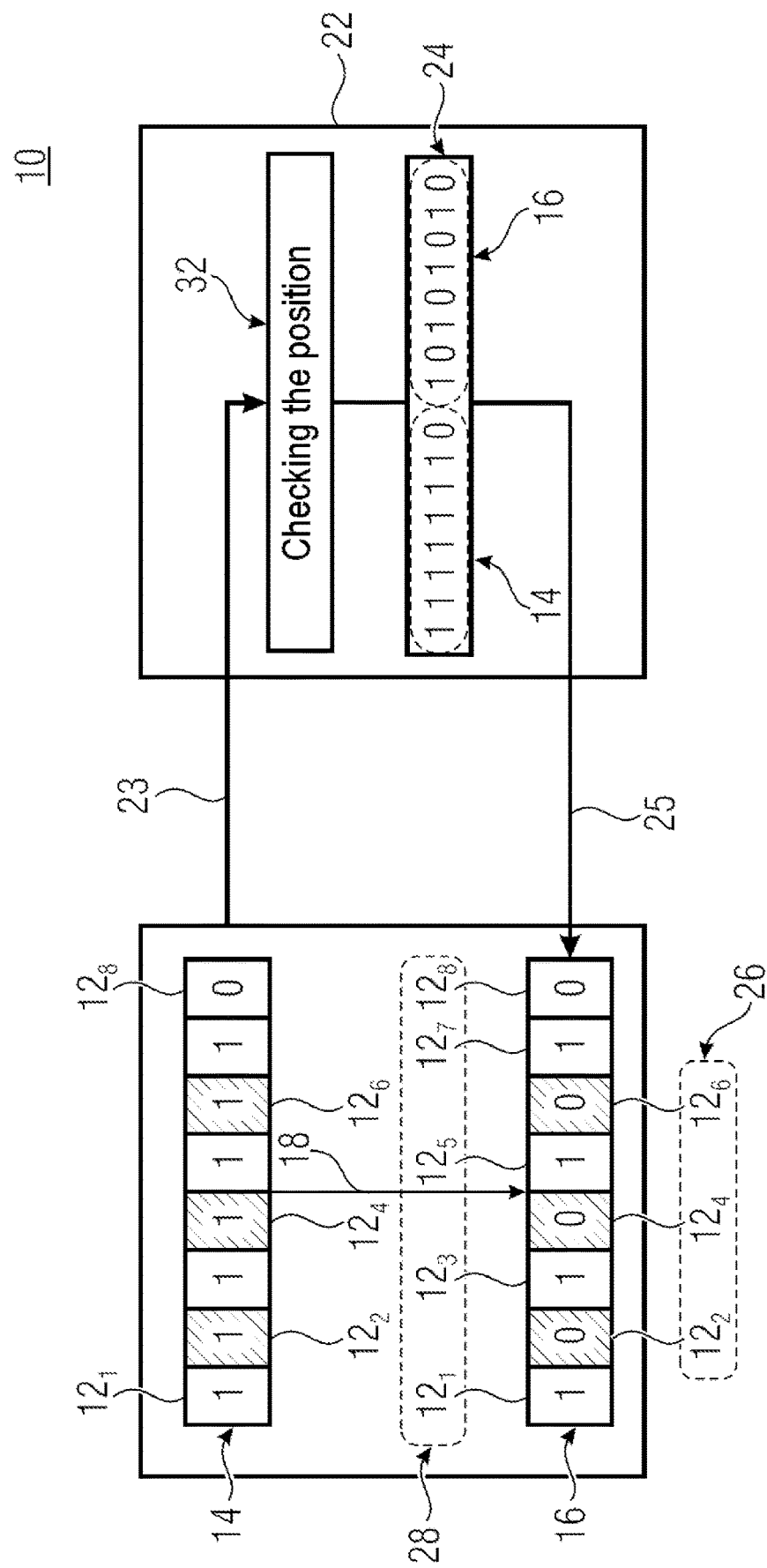
FIG. 1 shows a schematic block diagram of a storage device 10 according to an exemplary embodiment.

FIG. 1 shows a schematic block diagram of a storage device 10 according to an exemplary embodiment.

The storage device comprises a plurality of bitwise-modifiable memory cells $12_1$ to $12_8$, with only eight memory cells being shown as an example. According to exemplary embodiments, storage devices have several hundred, several thousand, several tens of thousands, or several million or more memory cells that can be grouped into blocks or other types of group.

FIG. 1 shows the memory cells $12_1$ to $12_8$ in a first state with an existing data content 14 and in a second state after the existing data content 14 has been overwritten with a data content 16 to be written using a write operation 18.

The storage device 10 comprises a control device 22 which is designed, in order to modify an existing data content 14 written to the group of memory cells shown with the data content 16 to be written, to perform a comparison 24 between the existing data content 14 and the data content 16 to be written in order to obtain a comparison result that may indicate, for example, that a discrepancy exists between the data contents 14 and 16, so that a modification of the information stored in memory cells $12_2$, $12_4$ and $12_6$ can be applied for the write operation 18.

Based on the comparison result of the comparison 24, the control device 24 can determine a subset 26 with the memory cells $12_2$, $12_4$ and $12_6$ for the modification. Active selection or non-selection in the subset 26 can be used to determine a remaining set 28. The control device 22 can write the data content to be written into the subset 26, at least into the selected bits or memory cells, leaving the remaining quantity 28 at least partially unchanged.

Furthermore, the storage device 10 is designed to read the existing data content 14 from a memory location of the storage device 10 for the modification and to verify the correctness of the memory location, which can be carried out by means of a corresponding function 32 of the control device 22, for example, but alternatively also by another device or another function block of the storage device 10.

By checking the correctness of the memory location in combination with the overwriting of the existing data content 14 with the data content 16 to be written, it can be reliably ensured that the existing data content 14 for an application is protected from access or that the availability is terminated, which an attacker could seek to prevent. For example, the test 32 can be used to ensure that the data content 16 to be written is not written at a different position than the existing data content 14, which would allow read access to both the existing data content 14 and the data content 16 to be written after the write operation 18 has been completed. Such a security risk can be reduced or even prevented with the storage device 10.

The check 32 and the comparison 24 can be executed in any order. For the check, the control device 22 can execute a read operation 23 by means of which the existing data content 14 is read from the memory cells $12_1$ to $12_8$. A change operation or write operation or programming operation 25 can modify at least the subset 26 depending, for example, on whether the check of the position is successful. According to exemplary embodiments, the write operation is aborted or not executed if the check 32 indicates that a read was made at an incorrect position.

According to an exemplary embodiment, the correctness of the memory location can be verified using redundant information. For example, redundancy information can contain information about the range or location, i.e., the memory cells, in which the existing data content 14 is written. According to an exemplary embodiment, the storage device is configured to obtain the redundancy information from error detection information associated with the existing data content 14, comprising, for example, information from an error detection code (EDC) and/or an error correcting code (ECC) in order to verify, based on the error detection information, that the correct existing data content was read at the correct memory location and/or was the target of the write operation, for example, when a further read operation is performed.

Figure 2:
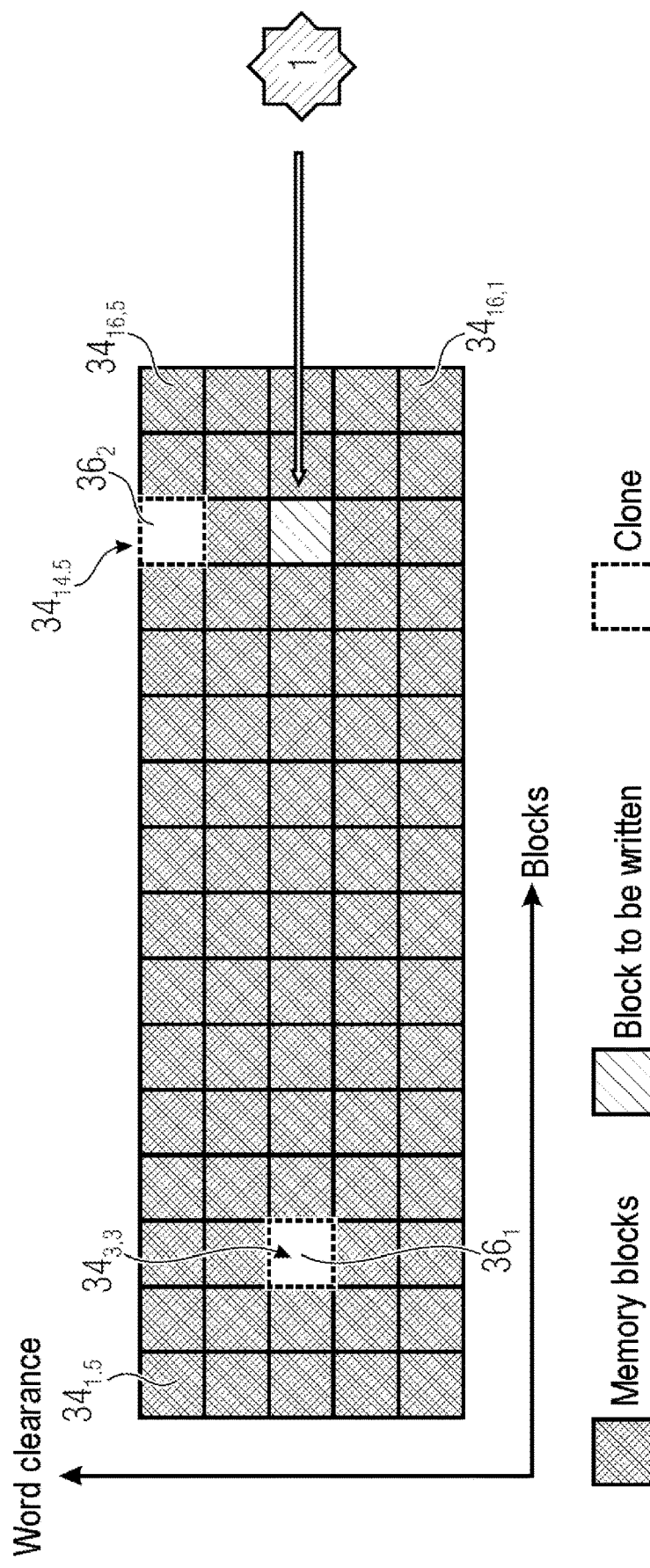
FIG. 2 shows a schematic illustration of an example storage device that can be used for exemplary embodiments to explain the process of the type or types of cloning.

Using FIG. 2, which shows a schematic illustration of an example storage device 20, different types or forms of clones will be explained, for example for RRAM memory cells. According to a first type of clone, the data block to be written is redirected to a different memory address. Although in this example only one block is written, so that a copy of it is not necessarily created, any data content that could be overwritten is not overwritten and continues to exist. According to a second type of clone, the data block to be written and a clone are written, for example into blocks $34_{3,3}$ and $34_{14,5}$. To do this, the same write operation is used, for example, so that two blocks are written and the two clones $36_1$, $36_2$ can exist as a copy of each other.

Figure 3A:
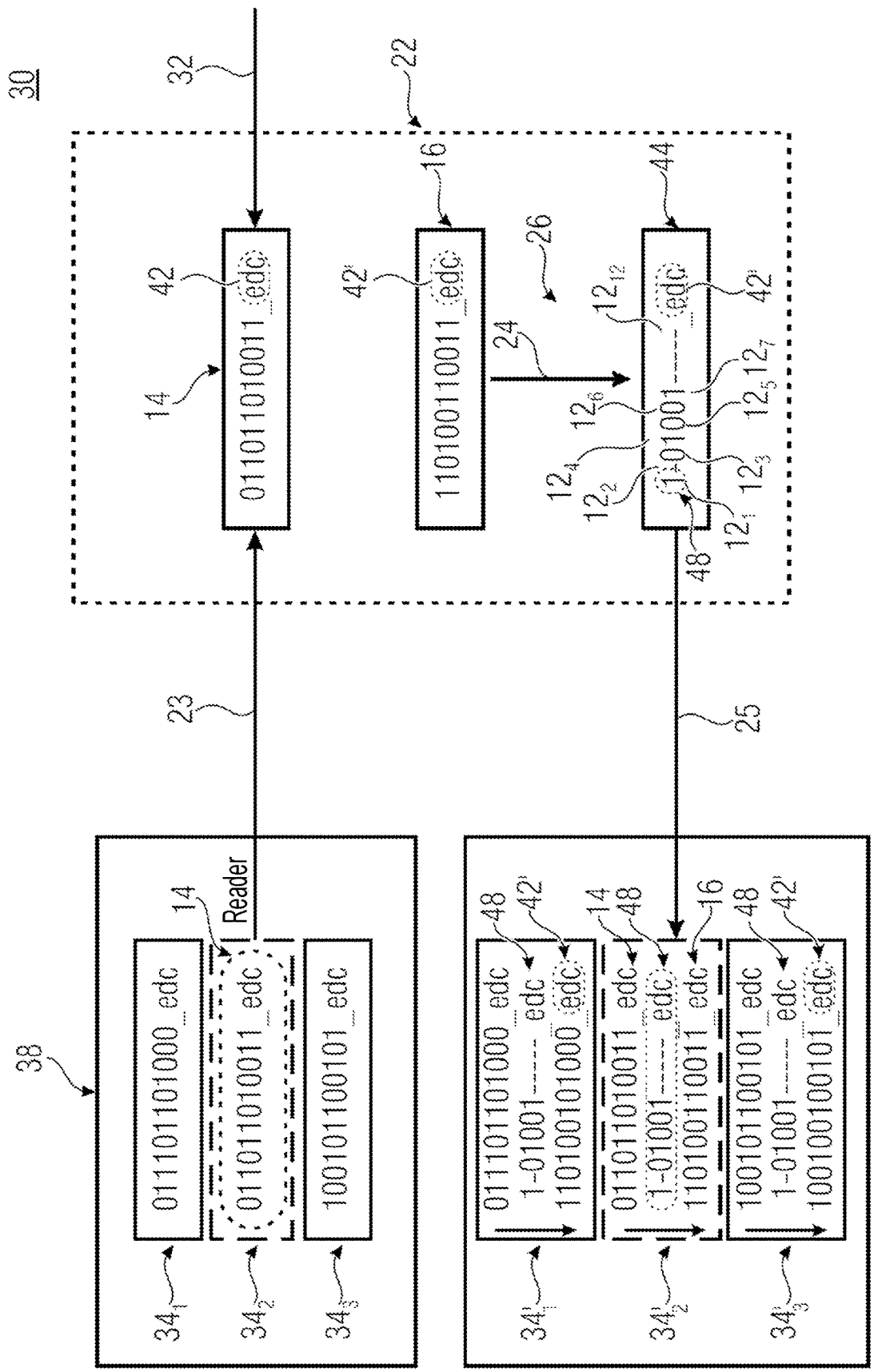
FIG. 3a shows a schematic block diagram of a storage device according to an exemplary embodiment for illustrating a modification operation on memory cells in a block.

FIG. 3a shows a schematic block diagram of a storage device 30 according to an exemplary embodiment. The explanations described below are readily applicable to the storage device 10 of FIG. 1. For a modification operation of memory cells in a block $34_2$ of a data storage device 38, which can comprise, for example, some or all of the memory cells $12_1$ to $12_8$ of FIG. 1, the control device 22 is designed in an exemplary way to execute the read operation 23.

In the exemplary embodiment of FIG. 3a, the check 32 can be based on redundancy information 42, which as EDC can form a part of the existing data content 14, wherein a position of the redundancy information 42 in the bit string can be arbitrary.

By comparing the existing data content 14 with the data content 16 to be written, a delta information can be obtained in the comparison 24 by combinatorial means, for example in the form of a bit mask or write mask 48, which specifies the values to be written for the subset 26 which designate, for example, the memory cells $12_1$, $12_3$, $12_4$, $12_5$, $12_6$ and $12_7$, but in one example not the memory cells $12_2$, $12_8$, $12_9$, $12_{10}$, $12_{11}$ and $12_{12}$ which can form the remaining set 28 from FIG. 1, and specify that a match may exist between the existing data content 14 and the data content 16 to be written.

Such a comparison result 44 can also contain updated redundancy information 42', which must also be written to the memory.

An updated memory block $34'_2$, which can be obtained by writing using the bit mask 48, would result in appropriately modified contents in memory blocks $34'_1$ and $34'_3$, respectively in the event of a corrupted write operation to the memory blocks $34_1$ or $34_3$. However, due to the modified redundancy information 42', for example, this would result in errors in the bit string obtained so that the result obtained may be unusable.

While this embodiment exploits the fact that the data storage device has memory cells that can be bitwise modified, that is, at the level of individual bits, the redundancy information can be obtained by means of hardware and/or software and allow the existing data content 14 that is to be overwritten to be identified. Alternatively or additionally, a so-called disguised read operation can be used by means of redundancy information, which can make an attack even more difficult. For example, disguising can occur by performing further read operations at the correct target position in addition to the actual read operation to be disguised, for example at other target positions, which under the assumption that an attacker is unaware of the actual target of the read operation can make its evaluation more difficult, because the attacker does not know when the data to be processed is read and when other data is read. In some embodiments, highly efficient memory encryption is provided, which reduces the probability of conflicting operations. Exemplary embodiments are also designed for large amounts of data to be written, for example, 16 bytes, or 128 bits.

As shown by the comparison result 44, the verified data can be used to create a bit mask or write mask 48.

Figure 3B:
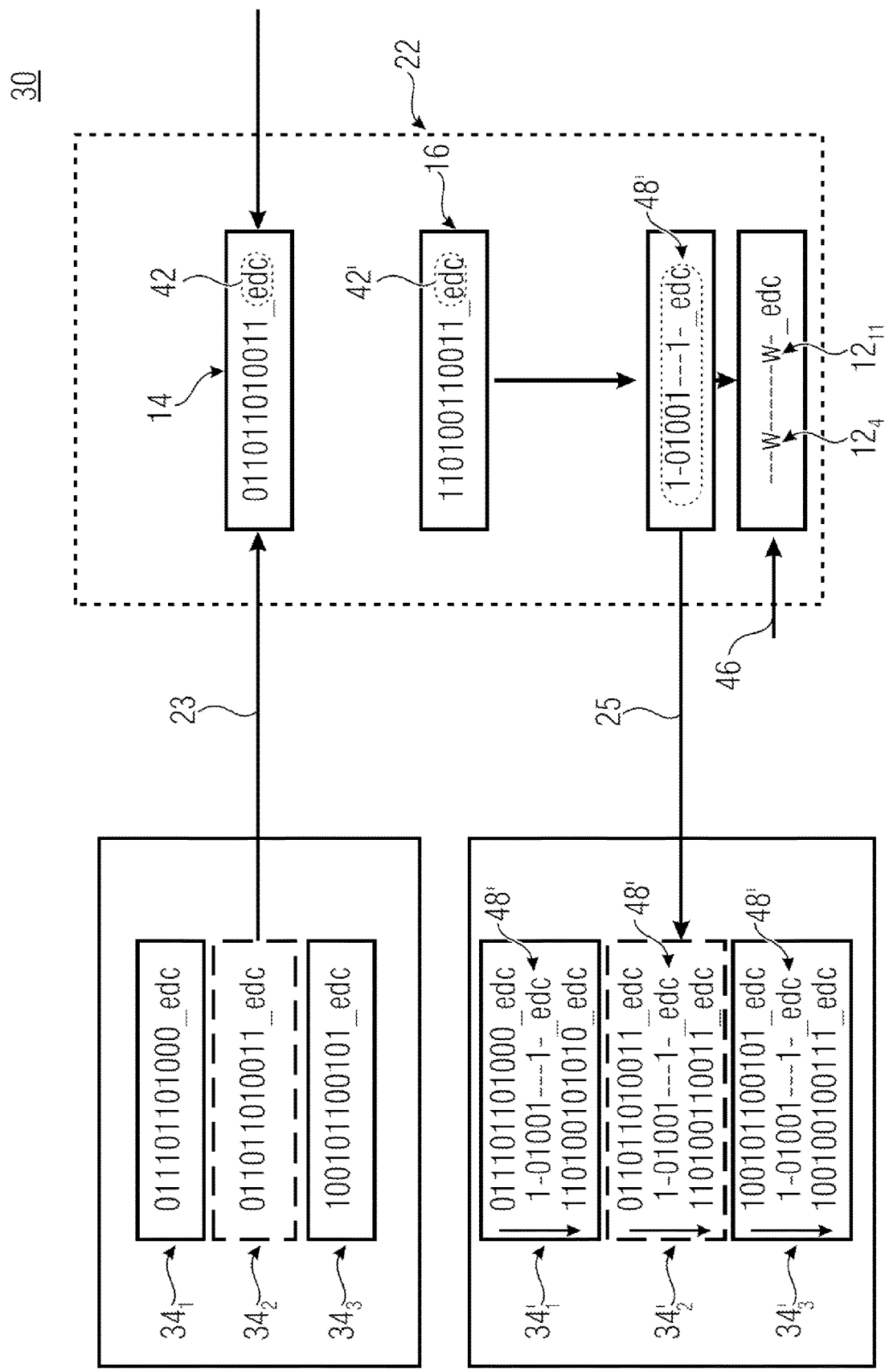
FIG. 3b shows a schematic block diagram of the memory device from FIG. 3a, in which in contrast to the illustration in FIG. 3a, so-called weak bits can optionally be additionally taken into account.

FIG. 3b shows a schematic block diagram of the memory device 30, in which in contrast to the illustration in FIG. 3a, so-called weak bits can optionally be additionally taken into account. In particular, a small number of so-called weak bits compared to the number of bits to be statistically written can be considered. For example, an appropriate read operation 46 can be used to obtain the information that memory cells $12_4$ and $12_{11}$ are classified as weak bits and therefore, for example, are intended to be written or updated in each write operation. The advantages obtained by this means allow, in addition to the illustration of FIG. 3a, a modified write mask 48' to be obtained, which also takes into account the weak bits in addition to the comparison result 44.

Here again, incorrectly writing the bit mask 48' to the memory blocks $34_1$ and $34_3$ would cause errors.

A storage device according to exemplary embodiments described here can be designed to use a combination of the modified subset of memory cells and remaining unchanged bits or memory cells to determine whether a result of the modification is correctly stored in the memory cells. For example, this can be carried out in the versions illustrated in FIG. 3a and/or 3b by reading out the data word written to the memory block $34'_2$ and verifying it, for example by means of the redundancy information 42'. However, such redundancy information is not necessary in order to carry out a verification as described, since for example, even without the redundancy information 42' a verification can be made to determine whether a correct memory word is present in the memory and/or whether the data content 16 to be written is now available at the intended address. This means that the control device may possibly, but not necessarily, be designed to perform the modification in such a way that the existing data content 14 and the redundancy information, associated with the data content 16 to be written, is written. The control device can be designed to use the redundancy information in addition to the combination of the modified subset and remaining unchanged bits to determine whether the result of the modification is correctly stored in the memory cells.

Other exemplary embodiments refer to the division of the write operation 25 into a first sub-step and at least a second sub-step, wherein a larger number of sub-steps, for example at least three, at least four, at least five or more, is also possible.

According to the exemplary embodiments, the data content 16 to be written is written to the same memory cells in which the existing data content 14 is located. The control device 22 can be designed to modify the subset 26 in a first sub-step, in which a first memory cell group of the subset comprising at least one memory cell is modified, and in at least a second sub-step, in which at least a second memory cell group of the subset also comprising at least one additional memory cell is modified, this being a different memory cell than in the first memory cell group. The control device is designed to verify between the first sub-step and the second sub-step that the first sub-step has been executed for the correct first memory cell group.

For the following explanations, it is assumed as an example that a number of two sub-steps is provided, in which a first or second subset of bits is to be written in each case, conditional on a required modification. For example, referring to the bit mask 48 of FIG. 3a which can have memory cells $12_1$ to $12_{12}$ in addition to the redundancy information 42 or 42', for example, the memory cells $12_1$ to $12_6$ could belong to the first subgroup and the memory cells $12_7$ to $12_{12}$ to the second memory cell group. An unequal size of the memory cell groups and/or a different number of memory cells in a memory cell group can be readily implemented.

A verification by the control device can be performed in such a way that, for example, a number of permissible bit changes exceeding a predefined number of bit changes during the first sub-step is interpreted as inadmissible. This means that if the control device 22 were to determine that an unexpectedly high number of memory cells has been modified, this can be interpreted as inadmissible. For example, the control device 22 can be designed to compare a number of the memory cells modified in the first sub-step with a threshold value which is based on a number of bit deviations between the existing data content and the data content to be written, in order to obtain a verification result. In the example of FIG. 3a, the comparison result 44 indicates an example of six bit deviations in the memory cells $12_1$, $12_3$, $12_4$, $12_5$, $12_6$ and $12_7$. Even if FIG. 3a differs from this, for example, in the case of a division into two subgroups for modifying the memory cells in two sub-steps, it can be assumed, for example in the sense of a statistical threshold value, that half of the changes occurs in each of the sub-steps, that is, three in each case. This numerical example can easily be adapted to modified numbers and/or sizes of subgroups, for example four expected changes for four equal-sized subgroups, or similar.

According to an exemplary embodiment, for the verification the storage device can compare the number of memory cells modified in the first step with a statistical threshold value which is based on a number of memory cells in the first memory cell group, i.e., the number of bits in the subset multiplied by a factor of 0.5. An increasing number of bits to be modified can then have a positive effect on the statistical threshold value, i.e. to make it more reliable.

However, this threshold is not necessarily the exact mathematical value, rather the exemplary embodiments also relate to the inclusion of deviations or tolerance ranges, for example, before clearing the weak bits explained in connection with FIG. 3b. A control device can be designed to determine the number of bit deviations between the existing data content 14 and the data content 16 to be written within a tolerance range, based for example on the mentioned weak bits or else truncations or the enabling of write errors, wherein the number can correspond, for example, to 0.5 times the number of memory cells in the first memory cell group.

The control device can be designed to determine the number of bit deviations between the existing data content and the data content to be written, taking into account a predetermined number of permissible error-susceptible memory cells, the weak bits, in the memory cell group, so that an increased number of bit changes compared to an error-free case is admissible in the verification result. For example, one, two, or three additional write operations that may be assigned to the weak bits can be allowed without inducing an error that can cause the write operation to be aborted.

For the above-mentioned verification, a read operation on the first memory cell group can be performed by the storage device, in particular the control device 22. In other words, after the memory cells in the first memory cell group have been modified, a read operation can be performed on this memory cell group. A result of the read operation can be interpreted as the actual state of the memory cells in the first memory cell group. The storage device can compare this actual state with a target state which represents the data content 16 to be written. This means that a verification can be performed by reading and based on the data to be written. A particular advantage here results from the only partial modification of the existing data content. The resulting bit mask 48 or 48' of FIG. 3a and FIG. 3b, respectively, is based on the fact that no write operation is performed in data contents that are not to be changed. When the data is read once again, the content of the first memory cell group after the first sub-step is already the same as the corresponding bit of the data content to be written to the first memory cell group. If an incorrect position was written to, for example to provoke a clone, the memory cell group that is read out would be expected to be different from the data content 16 to be written, at least in some of the bits of the remaining set 28, since at least some of these also differ from the existing data content 14.

According to one exemplary embodiment, the first memory cell group comprises a first half of the group of memory cells and the second memory cell group comprises a second half of the group of memory cells.

According to one exemplary embodiment, the control device 22 is designed to abort the modification if the verification fails, i.e., the second write operation is not executed. Optionally, additional actions such as deletion operations, alarm signal generation, activation and/or deactivation of specific functions or the like, can be triggered.

According to an exemplary embodiment, the existing data content 14 has a first useful information item and a first associated redundancy information item. The data content to be written has a second useful information item and a second associated redundancy information item, which means that the redundancy information is whether the modified data content is also modified.

According to one exemplary embodiment, the storage device has a data buffer, such as a cache. The control device can be designed to cache the existing data content in the buffer memory and to use a modification operation, such as a total modification or a modification in sub-steps, for a comparison with a result.

Figure 4A:
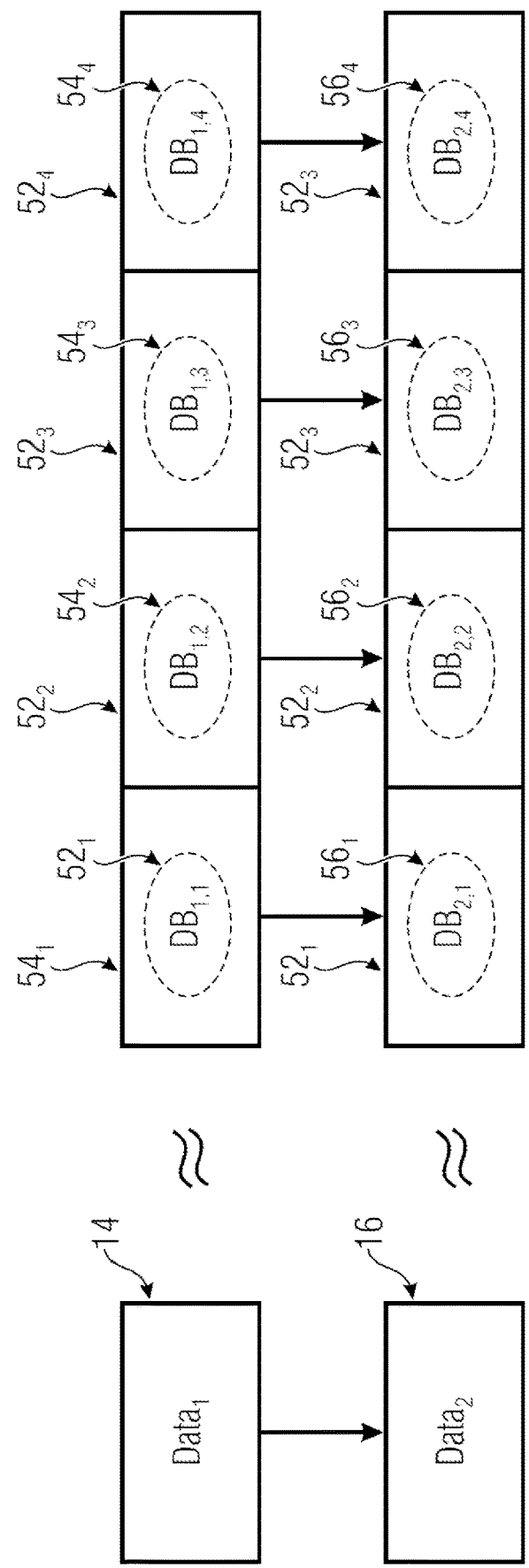
FIG. 4a-d shows schematic illustrations of a storage device according to an exemplary embodiment in different states for modifying memory cell contents.

Exemplary embodiments described above show an example of a bitwise analysis of the existing data content 14 and the data content 16 to be written. However, as explained based on the following figures, exemplary embodiments are not limited to this. For example, FIG. 4a shows an example partitioning of the existing data content 14 into multiple, that is, at least two, at least three, at least four, at least six, at least eight, at least ten or a higher even or odd number of memory blocks 52₁ to 52₄. Each of these memory blocks has an equal or differing number of memory cells and is designed to store a corresponding portion or data block 54₁, 54₂, 54₃ or 54₄ of the existing data content 14, which can have either the same size or data length or different sizes in relation to one another.

Furthermore, a corresponding partitioning of the data content 16 to be written into the memory blocks 52 in the form of data blocks 54₁, 56₂, 56₃ and 56₄ is shown. The memory blocks 52₁ to 52₄ can be arranged physically and/or logically adjacent to each other in a data storage device, but can also be distributed within it.

Figure 4D:
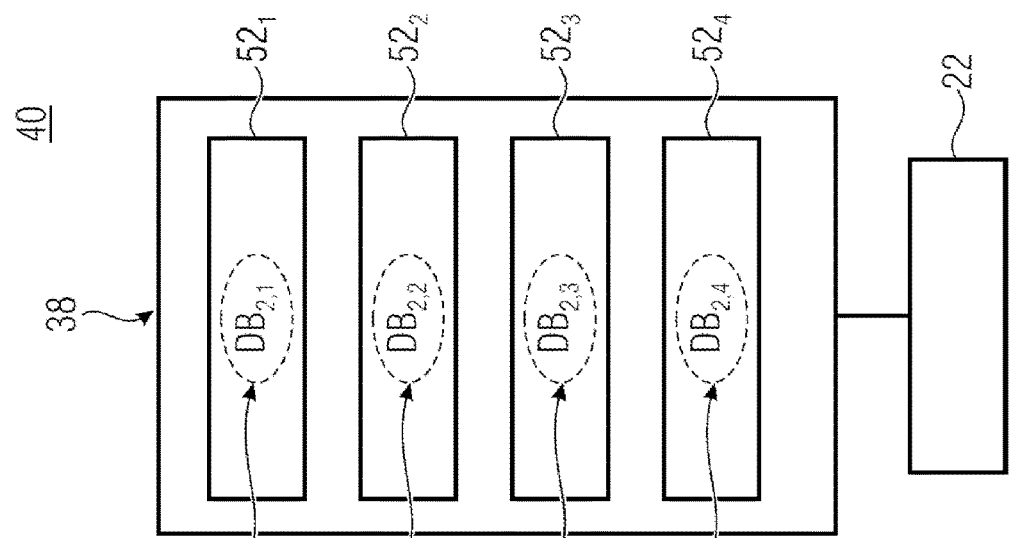
Figure 4C:
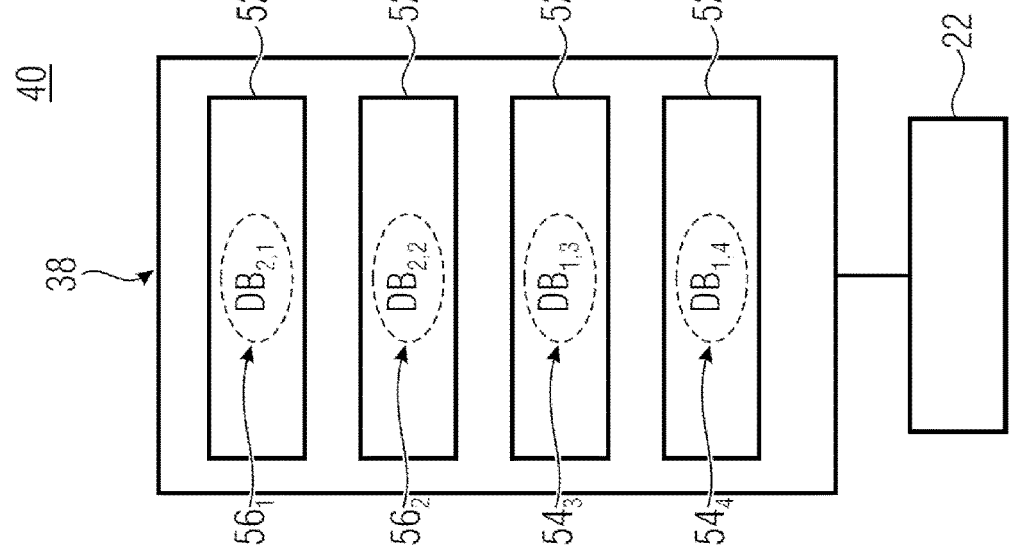
Figure 4B:
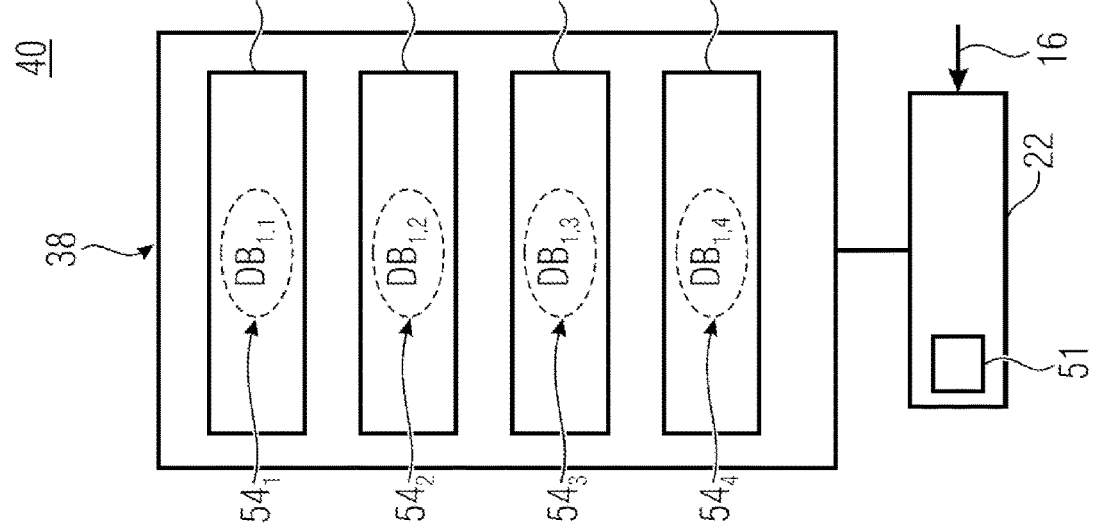

FIG. 4b shows a schematic block diagram of a storage device 40 according to an exemplary embodiment. The data storage device 38 contains inter alia the data blocks 52₁ to 52₄, in which the existing data content 14 from FIG. 4a in the form of the data blocks 54₁ to 54₄ is stored.

The control device 52 can receive the data content 16 to be written. Before writing any information, the control device 22 can read the existing data content 14 from the memory blocks 52₁ to 52₄, possibly by evaluation and/or use of redundancy information. The control device 22 can execute the write operations for the memory blocks 52₁, 52₂, 52₃ and/or 52₄ in such a way that corresponding redundancy information is determined for each of the data blocks 56₁ to 56₄ and is additionally stored in the memory blocks 52₁ to 52₄ accordingly.

The control device 22 can have a data buffer 51 and be designed to cache the existing data content 14 in the data buffer 51 and to use it for a comparison with a result of the modification operation. Alternatively or additionally, the data content 16 to be written can be stored in the buffer memory 51.

By receiving the data content 16 to be written, both the existing data content 14 and the data content 16 to be written can be present in the storage device 40 and can be stored in different memory areas, for example.

FIG. 4c shows the storage device 40 from FIG. 4b in a state in which the data blocks 56₁ and 56₂ have already been written to the memory blocks 52₁ and 52₄, while in other memory blocks, such as the memory blocks 52₃ and 52₄, parts of the existing data content 14 are still stored. The transition from the state of FIG. 4b to the state of FIG. 4c can take place in one or more write operations, such as those described in connection with FIGS. 3a and 3b. This means that the memory blocks 52₁ and 52₂ can be written in one common step or in multiple sub-steps.

Between two successive sub-steps, a check can be performed as to the actual number of memory cells that have been written. The control device 22 has knowledge of this and can compare the number of actually written memory cells with an expected value. The presence of weak bits can be taken into account by allowing a discrepancy between the number of deviations and the number of write operations. For example, due to a statistical distribution in data words, it can be assumed that on average half of the bits in two different data words, the existing data content 14 and the data content 16 to be written, and thus also in the respective data blocks 54 and 56, are different from each other. Thus, an expected value can be based on the possibility that approximately half, that is, 50%, of the memory cells will be written. A significant deviation from this can be interpreted as an error or an attack.

Tolerances as permitted deviations from this expected value can be designed to take into account the weak bits described in connection with FIG. 3b and/or to allow for statistical deviations, such as a number of write operations increased or reduced by 1%, 2%, 5% or 10%. Possibly, the whole half block, in other words data blocks 56₁ and 56₂, can be programmed to additional addresses in the data storage device 38, that is, cloned. Such operations can become almost or entirely unusable with the threshold analysis described. A check of the content of the data storage device 38 in the state of FIG. 4c against the existing data content 14 and/or the data content 16 to be is possible as an alternative or addition. In the absence of errors, the number of differing bits, i.e., the deviation between the content of data memory 38 in the memory blocks 52₁ to 52₄ read in the state of FIG. 4c, should match the number of modified bits, that is, the number of memory cells that were written to. However, a certain number of errors, for example one, two, three or more, can be allowed, for example, because they can be corrected by the error correction during reading. Alternatively or additionally, it is thus possible to take account of the fact that the error correction is not complete after half the write operation and therefore a false or incorrect error correction can be performed, which can generate up to three additional errors, for example, depending on the potential of the error correction, which errors can be taken into account in the threshold value under consideration. Such additional errors can also be taken into account by programming or software, for example in block-wise error information for the data blocks $56_1$ to $56_4$ or $54_1$ to $54_4$.

By counting the written memory cells or checking the counter value it is possible to ensure that a complete clone is not written, because only a single write operation can lead to a desired or permitted result. If a counter value that is too large indicates that an illegal copy may have been created, the remaining portion of the write operation may be omitted by aborting the operation so that the clone will not be completed. By dividing the write operation into sub-steps with an intervening verification, it is possible that at the time of the verification only a part, for example in FIGS. 4a to 4d, half, of the data block is programmed into the data memory 38 in one sub-step. This may cause the entire data block to be corrupted, for example not having a valid code word. When using redundancy information, it is possible that the entire data block in the memory cells $52_1$ to $52_4$, see FIG. 4c, is EDC-corrupt. This can also ensure that in the event that clones have been written, there is a low probability that these are also EDC-corrupt, which makes it difficult to read out or use the information content later. In other words, it can be assumed that two different data words, which exist between the existing data content 14 and the data content 16 to be written, will lead to a change in half of the bits, at least on a statistical average. In this respect, a number of modified bits can provide an indication of whether or not the write process was able to generate an unwanted "correct" clone.

In the state of FIG. 4c, the control device 22 can also be designed to perform a read operation of the memory blocks $52_1$ to $52_4$, to check whether the written data content was also stored at the correct address, that is, the memory blocks $52_1$ and $52_2$.

For example, based on reading out the memory blocks $52_1$ to $52_4$ and with knowledge of the existing data content 14, for example, by previously reading out the same data by means of the control device 22, a check can be carried out to determine in which memory cells or in how many memory cells the mixed data word in FIG. 4c differs from the existing data content 14 and the data content 16 to be written compared to the existing data content 14 and/or the data content 16 to be written. Since in the present exemplary embodiment only half the memory blocks 52 have been written and under the present assumption data words differ in every second bit on a statistical average, the storage device 22 can assume, for example, that 25% of the total bits are different from the existing data content 14 and/or the data content 16 to be written. This means that a number of bits that occur in the read-out state of FIG. 4c with respect to the existing data content 14 and/or the data content 16 to be written can be checked. In other words, a block-wise verification of the mixed old and new memory blocks can be performed. The number of differing bits can be checked. Because the existing data content 14 is known to the control device 22, it is possible that an error correction relevant to the check can also be performed, even if the combination of the contents of the memory blocks $52_1$ to $52_4$ is itself EDC-corrupt.

FIG. 4d shows the storage device 40 of FIG. 4c in a subsequent state, in which the data blocks $56_3$ and $56_4$ are written to the memory blocks $52_3$ and $52_4$ respectively, which means that the data content 16 to be written is present in the memory blocks $52_1$ to $52_4$ and the existing data content 14 is overwritten. The transition between the state of FIG. 4c and the state of FIG. 4d can take place, for example, between a first sub-step and a second sub-step of the write operation depending on the result of a verification. If the verification explained in connection with FIG. 4c shows that the write operation contains errors or an attack is suspected, the write operation can be aborted so that the state of FIG. 4d is not reached, or no further writing of the remaining data contents of the data blocks $56_3$ and $56_4$ is allowed.

In other words, the verification described in connection with FIGS. 3a and 3b can also be segmented differently than for a single data block. Thus, multiple data blocks can form a group to be written within one write operation if the existing data content 14 and/or the data content 16 to be written extends over multiple memory blocks 52, for example. In each of these partial write operations, a corresponding bit mask can be generated for a single block of memory or for a group of memory blocks in order to write only the bits for which differences are detected between the existing memory cell content and the memory cell content to be written, which means it is possible to take account of the fact that only those bits for which a corresponding modification is actually necessary are actively modified.

Although the procedure in connection with FIGS. 4b, 4c and 4d is written in such a way that the data content 16 to be written is written to the data blocks $54_1$, $56_2$, $56_3$ and $56_4$ consecutively, in exemplary embodiments of the present disclosure such a sequence is not necessary. The write operation of the data content 16 to be written can be partitioned in any desired way and any portion of this partitioning can be written first. The portions can be the same size or have different data sizes and a number of write operations other than two can be implemented as sub-steps.

It should also be noted that each of the data blocks $54_1$ to $54_4$ and/or $56_1$ to $56_4$ can have its own redundancy information, that the existing data content 14 or the data content 16 to be written is provided with an overall redundancy information item, or that the use of the redundancy information for the writing or checking is not required.

In exemplary embodiments which provide for the use of redundancy information, for example for error detection and/or error correction, write operations or a number of modified memory cells can be verified as a whole, i.e. for a sum of useful data memory cells and redundancy information memory cells. Alternatively, an individual verification can be carried out for modified user data memory cells and for redundancy information memory cells.

FIG. 5 shows a schematic flow diagram of a method 500 according to an exemplary embodiment. The method 500 can be used, for example, to modify a plurality of bitwise modifiable memory cells of a storage device. In 510 an existing data content written to the group of memory cells is read from a memory location of the storage device. In 520, the correctness of the memory location is checked for the modification. In 530 an existing data content written to the group of memory cells is compared with a data content to be written in order to obtain a comparison result. In 540 the method also comprises determining a subset of the group of memory cells for modification and a remaining set of memory cells based on the comparison result so that the data content to be written is written to the subset of the group of memory cells, leaving the remaining set at least partially unchanged.

In other words, a requirement when writing to a memory in a security-related application may involve ensuring (1) that the data is actually written, (2) that it is written to the correct memory location (the old data is overwritten), and (3) that it is not written multiple times (which would allow the value to be read from the targeted memory cell again after another write operation).

Exemplary embodiments do not relate exclusively to RRAM-type memories, which allows individual bits to be written while at the same time allowing unchanged bits in the written word to be left untouched. If only the bits to be modified are written, this will result in the correct data exclusively for the targeted block, in particular if the data is encrypted, which can be checked by simply reading it back and comparing. This limits the additional effort solely to the writing routine and does not necessarily affect the normal reading of the data.

One requirement may consist of verifying the value of the targeted word. This can be ensured either by means of SW redundancy or HW redundancy. In our case, the smallest logically writable section is a block that is protected by a strong data-dependent and address-dependent error detection code. With the "uniqueness" of the physical data due to the memory encryption, the old original and new data to be written differ statistically in 50% of their bits. This means that for an RRAM-type memory, only about 50% of the bits are written to convert the old data into the new data. If only these bits are written as intended, a write operation to a different position, or additionally to a different position than the intended position, will result in "random" data at the other position, which is detected by the redundancy mechanism during the read operation.

The write operation is divided into multiple sections, for example, in the first step only half the block. During the write operation, the memory counts how many bits are written. In the case of data such as encrypted data, it can be assumed that approximately 50% of the bits are written. If the number of written bits were almost 100%, this would mean that the data can be written to any position, regardless of the original value to be overwritten, thus allowing multiple parallel write operations. Thus, limiting the accepted number of written bits allows multiple write operations to be efficiently prevented. If the accepted number is exceeded, the writing of the remaining section of the block is skipped and the block remains incomplete with a defective error detection code. Whether the data has been written to the target position can now be verified by comparing the new written data and the remaining old data with a stored copy of the original old data. If this matches the information that the memory has only written about 50% of the bits, it can be concluded that the correct location has been written to (in this case, the remaining old data acts as a root of identification). If this is not the case, the second section of the write operation is skipped again. If direct access to the physical read/written data is not possible for different reasons, the comparison can also be performed in HW wherein only the number of different bits is provided, for example (this should be within the range of the number of bits written by the memory).

If the data cannot be verified at the location to be overwritten (for example, it is corrupt), a mechanism should be implemented (for example, by random read operations from the corrupted position in combination with other accesses) to prevent an attacker from spoofing only the corrupted data. For example, the attacker could try to pretend that the target block is corrupted by having an incorrect block addressed during the read operation. However, the real target block is intact, which can result in the so-called old/new data dilemma, i.e., that obsolete old data is kept for the updated, i.e., correct data.

As a result of weak bits or if the memory uses ECC/EDC, a small number of different bits can be accepted during the affected comparison operations.

Although some aspects have been described in connection with a device, these aspects also represent a description of the corresponding method, so that a block or a component of a device is also to be understood as a corresponding method step or as a feature of a method step. Similarly, aspects that have been described in relation to or as a method step also represent a description of a corresponding block or detail or feature of a corresponding device.

Depending on the specific implementation requirements, exemplary embodiments of the invention can be implemented either in hardware or in software. The implementation can be carried out by using a digital storage medium, such as a floppy disk, a DVD, a Blu-Ray disc, a CD, a ROM, a PROM, an EPROM, an EEPROM or a Flash memory, a hard disk or other magnetic or optical storage medium, on which electronically readable control signals are stored which can interact or do interact with a programmable computer system in such a way that the respective method is carried out. Therefore, the digital storage medium can be computer-readable. Some exemplary embodiments according to the invention thus comprise a data carrier, which has electronically readable control signals that are capable of interacting with a programmable computer system in such a way that one of the methods described herein is carried out.

In general, exemplary embodiments of the present invention may be implemented as a computer program product with a program code, wherein the effect of the program code is to carry out one of the methods when the computer program product is executed on a computer. For example, the program code can also be stored on a machine-readable medium.

Other exemplary embodiments comprise the computer program for carrying out any of the methods described herein, the computer program being stored on a machine-readable medium.

In other words, one exemplary embodiment of the method according to the invention is therefore a computer program that has program code for carrying out one of the methods described herein when the computer program is executed on a computer. Another exemplary embodiment of the method according to the invention is therefore a data carrier (or a digital storage medium or a computer-readable medium), on which the program for carrying out one of the methods described herein is recorded.

Another exemplary embodiment of the method according to the invention is therefore a data stream or a sequence of signals which represent or represents the program for carrying out one of the methods described herein. The data stream or the sequence of signals can be configured, for example, so as to be transferred over a data communication connection, for example via the internet.

Another exemplary embodiment comprises a processing device, such as a computer or a programmable logic device, which is configured or adapted to carry out any of the methods described herein. Alternatively or in combination, a security processor, a security module, a smart card, a trusted platform module (TPM), and/or a secure root of trust can be used.

Another exemplary embodiment comprises a computer on which the computer program for carrying out any of the methods described herein is installed.

In some exemplary embodiments, a programmable logic device (such as a field programmable gate array, an FPGA) can be used to perform some or all of the functions of the methods described herein. In some exemplary embodiments, a field-programmable gate array can interact with a microprocessor to carry out any of the methods described herein. In general, the methods in some exemplary embodiments are carried out by any hardware device. This can be a universally applicable hardware such as a computer processor (CPU) or hardware specific to the method, such as an ASIC.

The examples described above only represent an illustration of the principles of the present invention. It is implicit that modifications and variations of the arrangements and details described herein will be apparent to other persons skilled in the art. It is therefore intended that the invention be limited only by the scope of protection of the following patent claims and not by the specific details, which have been presented herein on the basis of the description and explanation of the exemplary embodiments.

What is claimed is:

1. A storage device having:
a plurality of bitwise-modifiable memory cells;
a control device configured, in order to modify an existing data content written to a group of memory cells with a data content to be written, to compare the existing data content and the data content to be written to obtain a comparison result;
wherein the control device is configured to determine a subset from the group of memory cells for modification and a remaining set, based on the comparison result, and to write the data content to be written to the subset, leaving the remaining set at least partially unchanged;
wherein, to perform the modification, the storage device is designed to read the existing data content from a memory location of the storage device and to verify the correctness of the memory location.

2. The storage device of claim 1, further configured to verify the correctness of the memory location by using redundancy information.

3. The storage device of claim 2, configured to obtain the redundancy information from error detection information associated with the existing data content in order to verify, based on the error detection information, that the correct existing data content is read and/or rewritten at a correct memory location.

4. The storage device of claim 1, in which the control device is configured to use a combination of the modified subset and remaining unchanged bits to determine whether a result of the modification is correctly stored in the memory cells.

5. The storage device of claim 4, in which the control device is designed to perform the modification in such a way that the existing data content and the redundancy information associated with the data content to be written is written, wherein the control device is configured to use the redundancy information in addition to the combination of the modified subset and remaining unchanged bits to determine whether the result of the modification is correctly stored in the memory cells.

6. A storage device having:
a plurality of bitwise-modifiable memory cells;
a control device configured, in order to modify an existing data content written to a group of memory cells with a data content to be written, to compare the existing data content and the data content to be written to obtain a comparison result;
wherein the control device is configured to determine a subset from the group of memory cells for modification and a remaining set, based on the comparison result, and to write the data content to be written to the subset, leaving the remaining set at least partially unchanged;
wherein, to perform the modification, the storage device is designed to read the existing data content from a memory location of the storage device and to verify the correctness of the memory location; and
wherein the data content to be written is written to the same memory cells in which the existing data content is located;
wherein the control device is designed to modify the subset in a first sub-step, in which a first memory cell group of the subset comprising at least one memory cell is modified, and in at least a second sub-step, in which at least a second memory cell group of the subset is modified with at least one additional memory cell; and
wherein the control device is designed to verify between the first sub-step and the second sub-step that the first sub-step has been executed for the correct first memory cell group.

7. The storage device of claim 6, in which the control device is configured to perform the verification in such a way that a number of bit changes exceeding a predefined number of permitted bit changes during the first sub-step is interpreted as inadmissible.

8. The storage device of claim 6, wherein the control device is configured to compare a number of memory cells modified in the first sub-step with a threshold value based on a number of bit deviations between the existing data content and the data content to be written, in order to obtain a verification result.

9. The storage device of claim 6, which for the verification is configured to compare the number of memory cells modified in the first sub-step with a statistical threshold based on a number of memory cells in the first memory cell group.

10. The storage device of claim 9, in which the control device is configured to determine the number of bit deviations between the existing data content and the data content to be written within a tolerance range to a number equal to 0.5 times the number of memory cells in the first memory cell group.

11. The storage device of claim 10, in which the control device is configured to determine the number of bit deviations between the existing data content and the data content to be written by taking into account a predetermined number of permissible error-susceptible memory cells in the group of memory cells, so that an increased number of bit changes compared to an error-free case is admissible in the verification result.

12. The storage device of claim 6, which is configured to perform a read operation on the first memory cell group for the verification.

13. The storage device of claim 12, which is configured to obtain an actual state of the memory cells of the first memory cell group from a result of the read operation and to compare the actual state with a target state which represents the data content to be written.

14. The storage device of claim 6, in which the first memory cell group comprises a first half of the group of memory cells and in which the second memory cell group comprises a second half of the group of memory cells.

15. The storage device of claim 6, in which the control device is configured to terminate the modification in the event of a failed verification.

16. The storage device of claim 1, in which the existing data content contains a first useful information item and a first associated redundancy information item and in which the data content to be written contains a second useful information item and a second associated redundancy information item.

17. The storage device of claim 1, comprising a data buffer, wherein the control device is designed to cache the existing data content in the data buffer and to use it for a comparison with a result of a modification operation.

18. The storage device of claim 1, in which the memory cells comprise at least one of
resistance-based RAM memory cells;
ferroelectric RAM memory cells;
magneto-resistive RAM memory cells; and
phase-changing RAM memory cells.

19. A method for modifying a plurality of bitwise-modifiable memory cells of a storage device, the method comprising:
reading an existing data content written to the group of memory cells from a memory location of the storage device;
verifying the correctness of the memory location for the modification;
comparing an existing data content written to the group of memory cells with a data content to be written, to obtain a comparison result;
determining a subset of the group of memory cells for modification and a remaining set of memory cells, based on the comparison result, so that the data content to be written is written to the subset of the group of memory cells, leaving the remaining set at least partially unchanged.

20. A non-transitory computer-readable medium comprising, stored thereupon, a computer program with program code for carrying out the method of claim 19 when the program is running on a computer.

* * * * *